(12) United States Patent
Felderman et al.

(10) Patent No.: US 10,733,237 B2
(45) Date of Patent: *Aug. 4, 2020

(54) CREATING DATA OBJECTS TO SEPARATELY STORE COMMON DATA INCLUDED IN DOCUMENTS

(71) Applicant: International Business Machines Corporation, Armonk, NY (US)

(72) Inventors: Gregory S. Felderman, Westminster, CO (US); Brian K. Hoyt, Thornton, CO (US)

(73) Assignee: International Business Machines Corporation, Armonk, NY (US)

(*) Notice: Subject to any disclaimer, the term of this patent is extended or adjusted under 35 U.S.C. 154(b) by 459 days.

This patent is subject to a terminal disclaimer.

(21) Appl. No.: 14/860,827

(22) Filed: Sep. 22, 2015

(65) Prior Publication Data

US 2017/0083600 A1    Mar. 23, 2017

(51) Int. Cl.
| | | |
|---|---|---|
| *G06F 16/93* | (2019.01) | |
| *G06F 16/28* | (2019.01) | |
| *G06F 16/835* | (2019.01) | |
| *G06F 40/14* | (2020.01) | |
| *G06F 40/123* | (2020.01) | |

(52) U.S. Cl.
CPC ............ *G06F 16/93* (2019.01); *G06F 16/285* (2019.01); *G06F 16/835* (2019.01); *G06F 40/123* (2020.01); *G06F 40/14* (2020.01)

(58) Field of Classification Search
CPC ......... G06F 17/30598; G06F 17/30312; G06F 17/30011; G06F 17/30371; G06F 16/93; G06F 40/14; G06F 40/123; G06F 16/285; G06F 16/835

See application file for complete search history.

(56) References Cited

U.S. PATENT DOCUMENTS

| | | | |
|---|---|---|---|
| 6,635,088 B1 * | 10/2003 | Hind | H03M 7/30 707/999.101 |
| 6,978,419 B1 * | 12/2005 | Kantrowitz | G06F 17/30687 707/E17.079 |
| 6,996,569 B1 | 2/2006 | Bedell et al. | |

(Continued)

FOREIGN PATENT DOCUMENTS

| | | |
|---|---|---|
| EP | 2416267 A1 | 2/2012 |
| GB | 2414820 A | 12/2005 |

(Continued)

OTHER PUBLICATIONS

IPCOM000213554D, An Intelligent storage technique and method for optimal storage of similar layout documents in Content Repositories, 4 pages, Dec. 21, 2001.*

(Continued)

*Primary Examiner* — Albert M Phillips, III
(74) *Attorney, Agent, or Firm* — Farrokh Pourmirzaie; Edell, Shapiro & Finnan, LLC

(57) ABSTRACT

In storing data, common data within a plurality of documents is identified. A data object is created separate from the plurality of documents and the identified common data is stored in the data object. The identified common data is replaced within the plurality of documents with an identifier referencing the data object. In at least some embodiments, the identifier is a native datatype construct.

14 Claims, 5 Drawing Sheets

(56) References Cited

U.S. PATENT DOCUMENTS

| | | |
|---|---|---|
| 7,509,387 B2 | 3/2009 | Hirsch |
| 7,593,949 B2 | 9/2009 | Begun et al. |
| 7,669,120 B2 | 2/2010 | Liao et al. |
| 7,739,586 B2 * | 6/2010 | Suver ............... G06F 17/2247 715/205 |
| 7,752,192 B2 | 7/2010 | Gu et al. |
| 7,774,311 B2 | 8/2010 | Cox et al. |
| 7,853,573 B2 | 12/2010 | Warner et al. |
| 8,015,218 B2 | 9/2011 | Thienot et al. |
| 8,099,397 B2 | 1/2012 | Felderman et al. |
| 8,117,234 B2 | 2/2012 | Parrott |
| 8,161,023 B2 | 4/2012 | Felderman et al. |
| 8,788,509 B2 | 7/2014 | Ruellan et al. |
| 8,954,400 B2 | 2/2015 | Brown |
| 9,390,099 B1 | 7/2016 | Wang et al. |
| 2002/0065822 A1 | 5/2002 | Itani |
| 2004/0205668 A1 * | 10/2004 | Eastlake, III ....... G06F 17/2247 715/234 |
| 2005/0066190 A1 | 3/2005 | Martin |
| 2006/0206518 A1 * | 9/2006 | Bhatia ..................... G06F 16/80 |
| 2007/0106689 A1 | 5/2007 | Slater |
| 2009/0119320 A1 * | 5/2009 | Welsh ..................... H03M 7/30 |
| 2010/0131475 A1 | 5/2010 | Kataoka et al. |
| 2011/0225154 A1 | 9/2011 | Isaacson et al. |
| 2011/0231619 A1 | 9/2011 | Shalev et al. |
| 2015/0121199 A1 | 4/2015 | Wu et al. |
| 2015/0293968 A1 | 10/2015 | Dickie |
| 2017/0116193 A1 | 4/2017 | Felderman et al. |
| 2018/0165356 A1 | 6/2018 | Felderman et al. |

FOREIGN PATENT DOCUMENTS

| | | |
|---|---|---|
| GB | 2458371 A | 9/2009 |
| WO | 2010026205 A1 | 3/2010 |
| WO | 2012038742 A1 | 3/2012 |

OTHER PUBLICATIONS

Harold, XML in a Nutshell, 2nd Edition, 5 pages. (Year: 2002).*

List of IBM Patents or Patent Applications Treated as Related, Jan. 6, 2017, 1 page.

Malysiak-Mrozek, et al; "Data Grouping Process in Extended SQL Language Containing Fuzzy Elements." Man-Machine Interactions. Springer Berlin Heidelberg, 2009. 247-256.

List of IBM Patents or Patent Applications Treated as Related, Mar. 10, 2017, 1 page.

Nicola, Matthias, and Bert Van der Linden. "Native XML support in DB2 universal database." Proceedings of the 31st international conference on Very large data bases. VLDB Endowment, 2005, 11 pages.

* cited by examiner

CREATING DATA OBJECTS TO SEPARATELY STORE COMMON DATA INCLUDED IN DOCUMENTS

BACKGROUND

1. Technical Field

Present invention embodiments relate to data storage, and more specifically, to creating data objects to store common data included in multiple documents separately from the documents.

2. Discussion of the Related Art

Across many industries, massive amounts of data are generated for document transactions, statements, and other such interactions. For example, monthly reports from telephone and bank companies can include hundreds of thousands of statements, such as one per customer. Statements can be in any type of data format, such as Advanced Function Presentation (AFP), Portable Document Format (PDF), line data format, and Extensible Markup Language (XML). Tri some situations, these statements need to be archived for a given period of time in a particular manner. For example, banks are legally required to archive a specific envelope for each transaction for legal purposes. However, since each statement may have larger resources (i.e., logos), templates, overlays, etc., these statements may use significant amounts of storage.

Moreover, with emerging standards, like ISO 20022 in the financial industry, XML is quickly becoming the standard by which information is exchanged worldwide. Consequently, billions of XML transactional messages are being generated yearly. Due at least in part to improvements in data analytics, transactional messages are also growing in size to accommodate more information, like remittance data. Since all of the information included in the XML transactional messages can be used by the sender or receiver during the lifecycle of the message, transactional metadata is extracted and stored in columns of databases for retrieval and analysis. Consequently, a significant amount of storage resources must be used to store this data.

SUMMARY

According to one embodiment of the present invention, creating data objects to store common data included in documents includes identifying common data within a plurality of documents. A data object is created separate from the plurality of documents and the identified common data is stored in the data object. The identified common data is replaced within the plurality of documents with an identifier referencing the data object. In at least some embodiments, the identifier is a native datatype construct.

BRIEF DESCRIPTION OF THE DRAWINGS

Generally, like reference numerals in the various figures are utilized to designate like components.

DETAILED DESCRIPTION

The techniques presented herein provide methods, systems, and computer program products for creating data objects to store common data included in documents. Generally, techniques presented herein can identify common nodes, elements, text, and other such data included in a group of documents and create a resource data object to store the identified commonalties. The common nodes, elements, and textual areas of documents may be removed from the documents and replaced with an identifier that references the resource data object. The identifier is a native datatype construct, such as an XInclude directive, that allows the resource to be combined with a modified document (i.e., a document including an identifier) when the document is retrieved. The techniques presented herein can significantly reduce storage requirements for data storage of documents that include repetitive information, such as XML transactional messages. Moreover, techniques presented herein may significantly reduce network bandwidth usage.

Figure 1:
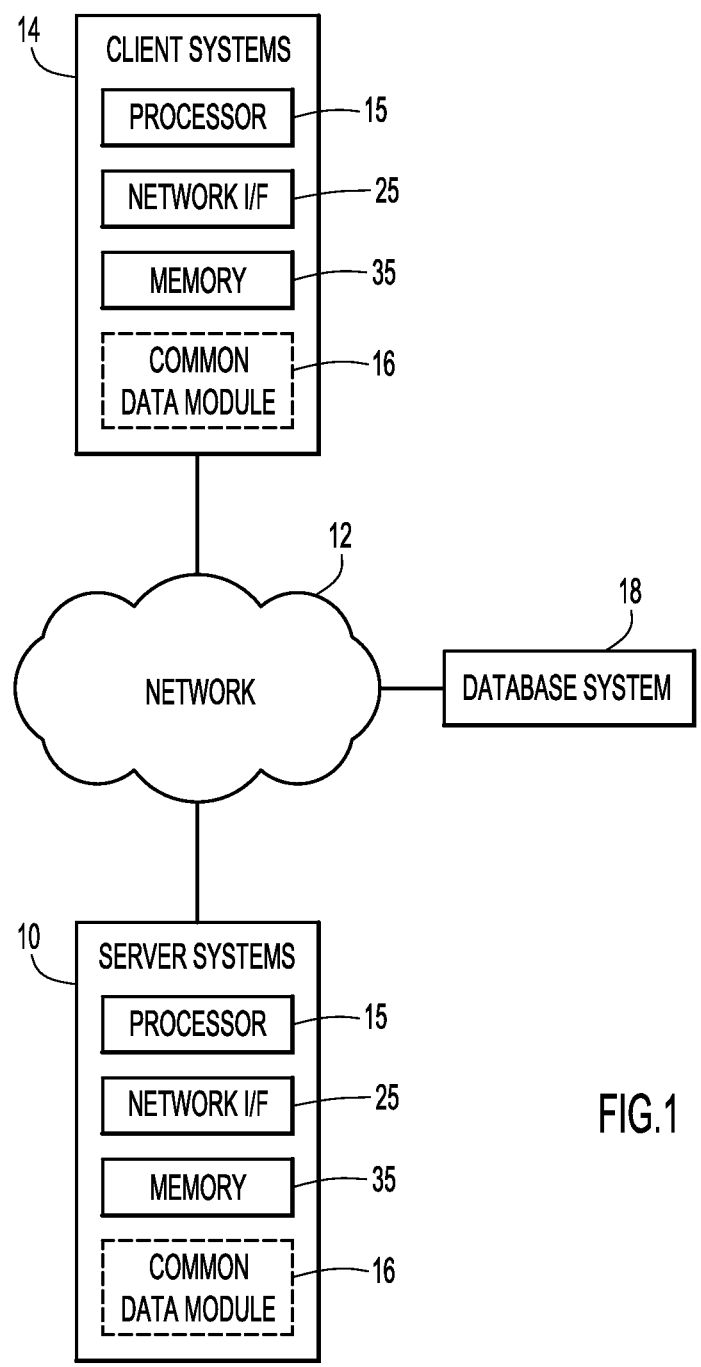
FIG. 1 illustrates an example environment in which the present general inventive concept can be embodied.

An example environment for use with present invention embodiments is illustrated in FIG. 1. Specifically, the environment includes one or more server systems 10 and one or more client or end-user systems 14. Server systems 10 and client systems 14 may be remote from each other and communicate over a network 12. The network 12 may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

The server systems 10 include a common data module 16 to analyze any received documents and identify common data. A database system 18 may store various information for the analysis (e.g., business logic and algorithms to determine whether data is considered common). The database system 18 may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, Intranet, etc.). The database system 18 may also store any documents received by the server system 10, any database objects created by the server systems 10 and/or client systems 14, and/or modified versions of the documents created by the server system 10 and client systems 14.

Client systems 14 enable users to submit documents (e.g., documents for document collections, documents for analysis to determine common information, etc.) to server systems 10 to determine any common information in the documents. The client systems 14 may present a graphical user (e.g., GUI, etc.) or other interface (e.g., command line prompts, menu screens, etc.) to solicit information from users pertaining to the desired documents and analysis, and may provide reports including analysis results (e.g., identified common data, etc.).

Server systems 10 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, common data module 16, browser/interface software, etc.).

Alternatively, one or more client systems 14 may analyze documents to identify common information included in documents when operating as a stand-alone unit. In a stand-alone mode of operation, the client system 14 stores or has access to the data (e.g., XML transactional messages), and includes the common data module 16. The graphical user (e.g., GUI, etc.) or other interface (e.g., command line prompts, menu screens, etc.) solicits information from a corresponding user pertaining to the desired documents and analysis, and may provide reports including analysis results.

Common data module 16 may include one or more modules or units to perform the various functions of present invention embodiments described below. The various modules may be implemented by any combination of any quantity of software and/or hardware modules or units, and may reside within memory 35 of the server and/or client systems for execution by processor 15.

Figure 2:
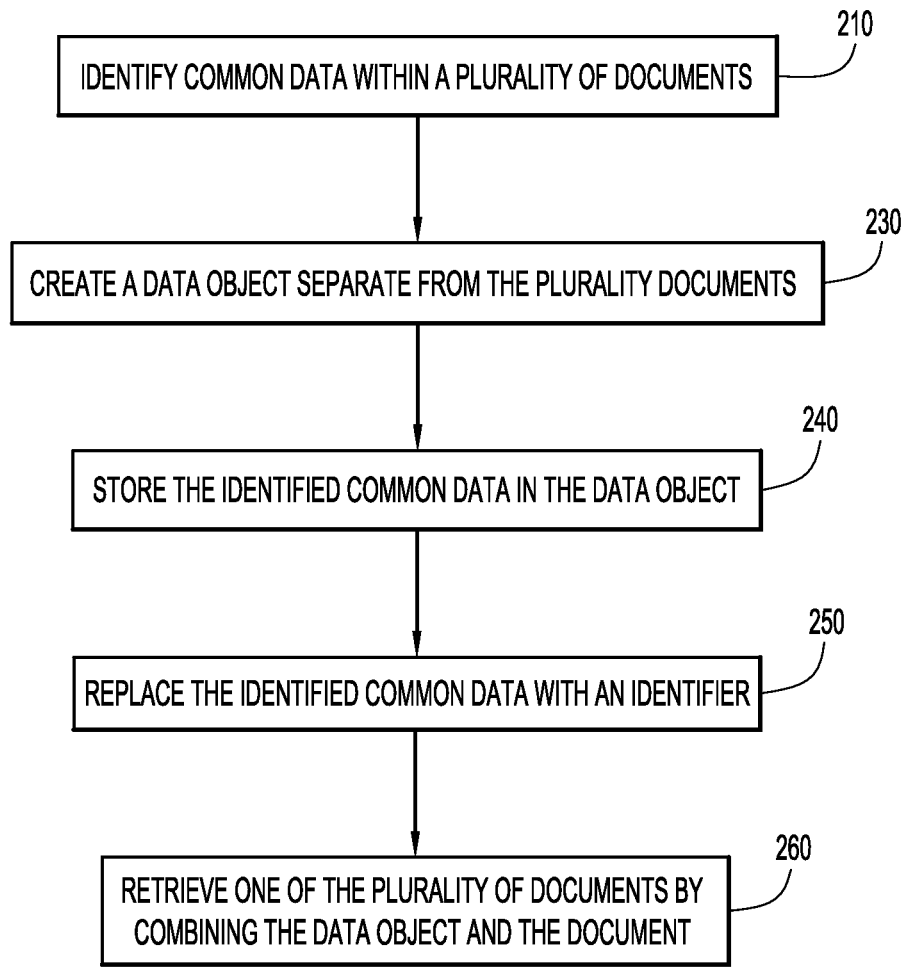
FIG. 2 is a procedural flow chart of creating data objects to store common data included in documents according to a present invention embodiment.

With reference now to FIG. 2, procedural flow chart 200 depicts operations (e.g., of common data module 16) for creating data objects to store common data included in documents according to a present invention embodiment. However, for the purposes of this application, the term "document" is not intended to only denote different files. Instead, the term "document" may include any item containing electronic content, such as any message, portion of a message, transaction, image, video, audio, etc., even if multiple items are included in a single file. For example, multiple XML transactional messages may be included in a single file and each of these messages may be considered a document fix the purposes of this application.

Initially, at step 205, common data within a plurality of documents is identified. The common data may be any content included in the documents, such as common nodes, common text, etc. and, thus, is not limited to specific industry phrases or other such limitations. In some embodiments, a user may identify common data or specify certain nodes to be considered when identifying common data. For example, if a user, such as the producer of XML data, knows that a certain node or piece of data is included in every document, a user may specify that this node or text should be identified as common data. As another example, a user may specify that common data can only be found at a certain node or group of nodes, such as only within customer information. Additionally or alternatively, common data may be identified based on various thresholds. In these embodiments, a list of candidate common data can be built and then a determination as to whether the candidate common data should be considered as common data fix the purposes of extraction is made, as is described in more detail below with regards to FIGS. 3 and 4. These embodiments may be useful when common data exists, but not in every document.

At steps 230 and 240, a data object is created and the identified common data is stored in the data object, respectively. The data object is a separate resource from the documents and stores a single copy of the common data from the documents. Consequently, if common content is included in 100 documents, the storage requirement for the common data may reduced by a factor of 100. At step 240, the data object is stored so that the extracted replaced) common data can be inserted into any of the documents it was extracted from when these documents are retrieved at step 260.

At step 250, the identified common data is replaced with an identifier. The identifier is a native datatype construct that references the data object resource and, thus, there is no need to create a new data object or to require two parties to exchange a protocol when the identifier is used. For example, transactional XML messages are typically archived in batch with many thousands contained in a single file. During the indexing and archival of these messages, common XML data sections discovered across these messages are extracted and replaced with an XML XInclude directive, which is a reference to another data object and may work with any XML format, such as Scalable Vector Graphics (SVG) and Extensible Hypertext Markup Language (XHTML). In some embodiments, the extracted content is named (i.e., the data object created at step 230 is named) so that the XInclude directive (or any other native data construct) can easily refer to the extracted content. The identifier may include any identifier to reference the common data (e.g. tag, pointer, section header, etc.)

When steps 230, 240, and 250 are performed, content from the original documents is not changed or altered in any manner when it is replaced, regardless of the specific identifier that is used or the type of data object created. Instead, common data is extracted from multiple documents, moved to the data object resource (without modification), and stored in the created data object. Meanwhile, data that is not identified or considered to be common data is left untouched and unchanged. Consequently, the content of the documents are properly stored for archival purposes (i.e., sufficient for financial records) when common data has been replaced with an identifier that references a newly created data object.

Figure 5:
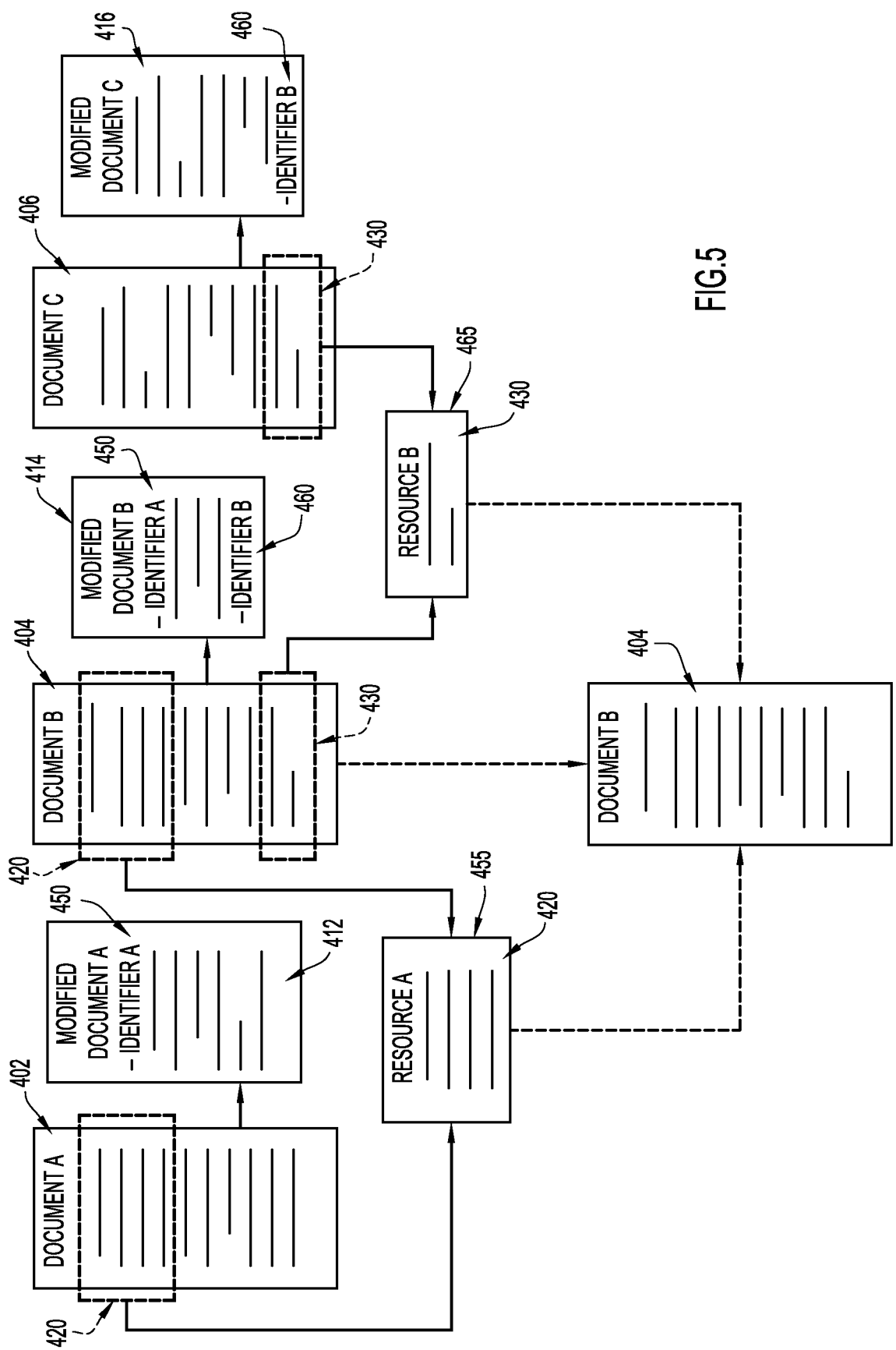
FIG. 5 is a data flow diagram depicting operations of the flow charts of FIGS. 2 and 3 performed by the elements of the block diagram of FIG. 1 according to a present invention embodiment.

At step 260 one of the documents from the plurality of documents is retrieved. When a document that has common data in it is retrieved, the native datatype construct identifier included in the document will instruct the system to include the common data included in the data object created in step 240 to be inserted into document. Consequently, the retrieved document will be identical to the document that was initially stored and analyzed for common data. For example, if the documents are XML transactional messages, the XInclude directive will notify the system to reinsert the removed common data (by inserting the content stored in the new data object) during retrieval of an XML message including the XInclude directive. Another example of step 260 is shown in FIG. 5 and described below.

Figure 3:
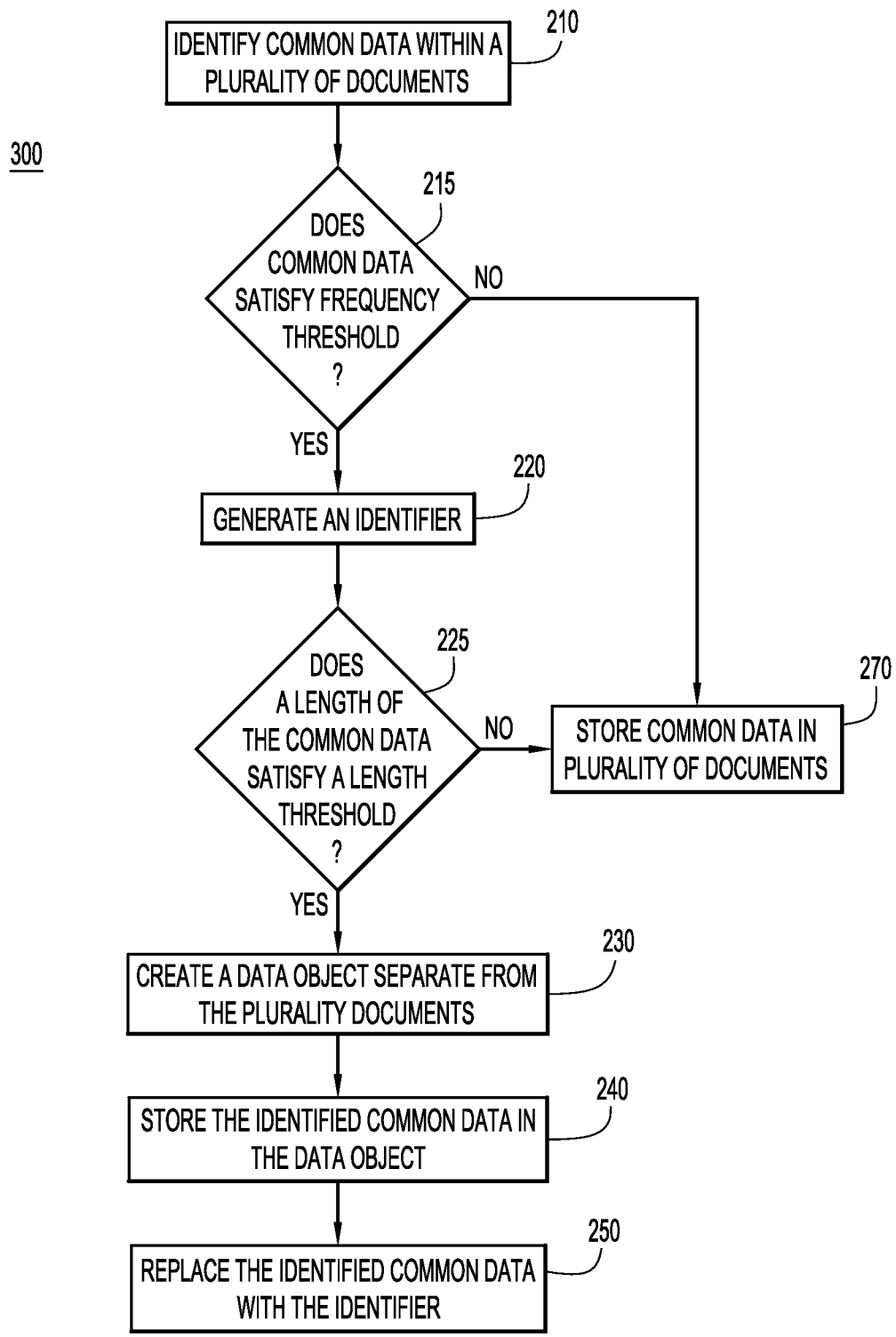
FIG. 3 is a procedural flow chart of identifying common data included in documents according to a present invention embodiment.

Now referring to FIG. 3, procedural flow chart 300 depicts operations for determining common data based on thresholds (e.g., via common data module 16), according to at least one present invention embodiment. For the purposes of the description of FIG. 3, reference is also made to FIG. 2. In procedural flow chart 300, common data is initially identified within a plurality of documents at step 210 in the same manner discussed above with regards to FIG. 2. However, the identified common data is not immediately replaced. Instead, the identified common data may be considered as candidates to be replaced. For example, at step 215, the identified common data is compared to a frequency threshold. The frequency threshold may be a ratio or percentage that indicates how often data must appear within all of the documents being analyzed in order to be considered common data. In some embodiments, the frequency threshold may set a minimum percentage of documents that data must be included in to be considered common data. For example, if the frequency threshold requires data to be found within 60% of the plurality of documents, data will only be removed from the documents if it is included in over 60% of the documents. As a more concrete example, if XML transactional messages from a single retail location over a single week are analyzed, the store ID may be in 100% of the data and, thus, be considered common data regardless of a frequency threshold. By comparison, if purchases are evenly distributed over the week, the purchase date may not be considered common data if the frequency threshold is set to a percentage equal to or over 15% since only approximately 14% (i.e., 1 out of 7) of the transactional messages will can include the same date. In some embodiments, the frequency threshold may be set manually.

At steps 220 and 225, an identifier is generated and a determination is made as to whether the length of the common data satisfies a length threshold that is based on the length of the generated identifier, respectively. In at least some embodiments, the length threshold is simply the length of the generated identifier and the determination made at step 225 is made by comparing the length of the identifier to the length of the common data to be replaced. In these embodiments, if the common data is longer than the generated identifier, the common data may be replaced with the identifier. However, if the common data is shorter than the generated identifier, it may be detrimental to replace the common data with the generated identifier since the replacement would not generate any reduction in the storage requirement for the documents. In other embodiments, the length threshold may be based on the length of the identifier, but also consider additional factors. For example, in some embodiments that length threshold may require the common data to be longer or larger than the identifier by a certain predetermined measure.

Still referring to FIG. 3, if a determination is made that the common data does not satisfy the frequency threshold or the length threshold at step 215 or 225, the common data may be left in the documents and stored therein at step 270. By comparison, if the common data satisfies the frequency threshold and the length threshold, a data object may be created, the common data may be stored in the data object and the common data may be replaced with the identifier at steps 230, 240, and 250, respectively, in the same manner discussed above with regards to FIG. 2. However, FIG. 3 only represents one example present invention embodiment. In other embodiments, data is replaced with an identifier if it satisfies either the frequency threshold or the length threshold. Additionally or alternatively, a determination as to whether to extract and replace common data may be made with respect to any desirable factors or algorithm.

Figure 4:
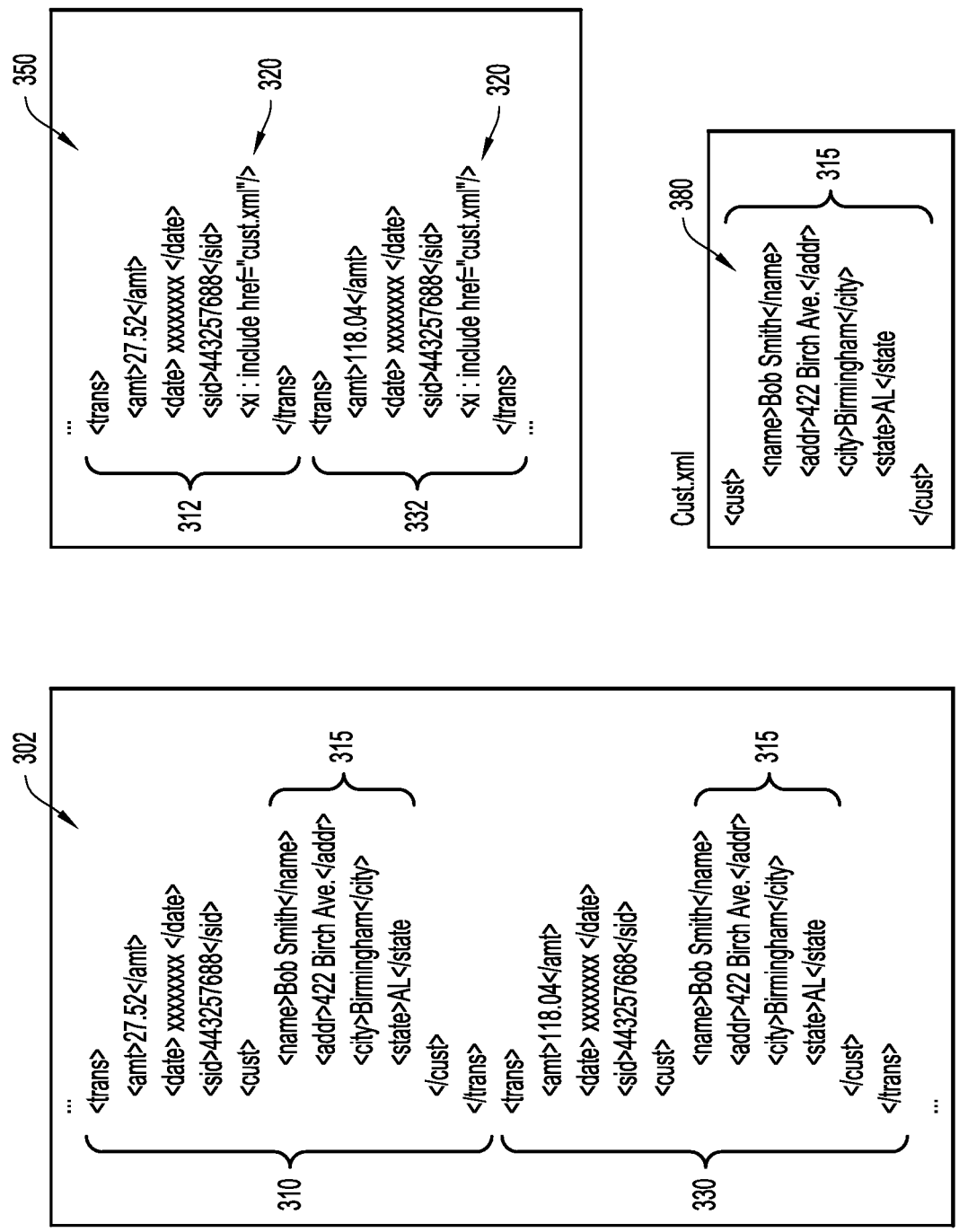
FIG. 4 depicts example input documents together with the resulting files after performing the extraction of the common data, according to a present invention embodiment.

Now turning to FIG. 4, example input documents are illustrated together with the resulting files after performing the extraction of the common data. More specifically, original XML transactional messages 302 includes a first document 310 and a second document 330 that represent two transactions made by Bob Smith at a retail store. Since document 310 and document 330 represent purchases made at the same store by the same customer, documents 310 and 330 both include the same store identification (ID) ("<sid>443257688</sid>") and customer information 315 ("<cust>" . . . </cust>), including the customer's name ("<name>Bob Smith</name>"), address ("<addr>422 Birch Ave.<addr>"), city ("<city>Birmingham</city>"), and ("<state>AL</state>"). However, the transactions were for different amounts ("<amt> . . . </amt>") on different days (<date> . . . </date>). Specifically, document 310 is for a purchase of $27.52 made on a first date and document 330 was for a purchase of $118.04 made on a second different date.

Based on the information included in documents 310 and 330, techniques presented herein modified document 310 and 330 by extracting the customer information 315 and created a new data object 380 (including the customer information 315. Transactional messages 350 includes the resultant modified documents 312 and 332 where extracted customer information 315 has been replaced with an identifier 320 in each of the documents 310 and 330. In the depicted embodiment, the identifier 315 is an XInclude directive because the original documents 310 and 330 were XML documents. As can be seen, replacing the common customer information 315 with an identifier 320 results in the modified documents 312 and 332 being substantially smaller (i.e., include less data) than original documents 310 and 330, respectively, even when combined with the new data object 380. Consequently, replacing the common data lowers the storage requirement for XML transactional messages 302.

Still referring to FIG. 4, although the first document 310 and the second document 330 include the same store ID, the store ID node is not moved into a new data object. In this example, the store ID node is not moved because, as seen in the modified transactional messages 350, the store ID node is shorter than the identifier 320. Thus, as discussed above with regards to FIG. 3, the store ID does not satisfy the length threshold and is not moved into a new data object. However, in other embodiments, the store ID node could be moved into a data object or be moved into data object 380 with the customer information node. For instance, if the store identification node contained more information about the location of the store, and this location is repeated on many, say 60%, of the transactions, then a new data object could be created and this node could be replaced and archived in the new data object as a new resource.

Now turning to FIG. 5, additional example input files 402, 404, and 406 are illustrated together with the resulting files (including modified files 412, 414, and 416, as well as, resources 455 and 465) after performing the extraction of the common data. As mentioned, when common data is extracted from a document 405, 404, 406, the modified document includes an identifier to replace the extracted common data. In FIG. 5, Document A 402 shares common data 420 with Document B 404 while Document C 406 shares common data 430 with Document B 404 that is different from common data 420.

Due to the identification of common data 420, Document A 402 and Document B 404 are each modified to extract common data 420. A new data object, Resource A 455, is created and the common data 420 is stored in Resource A 455. The common data 420 is also replaced with identifier A 450 that includes a reference, such as an XInclude reference, to Resource A 455, in each of modified document A 412 and modified document B 414. Similarly, due to the identification of common data 430, Document B 404 and Document C 406 are each modified to extract common data 430. A new data object, Resource B 465, is created and the common data 430 is stored in Resource B 465. The common data 420 is also replaced with identifier B 460 identifier B 450 that includes a reference, such as an XInclude reference, to Resource B 465, in each of modified document B 414 and modified document C 416.

Once common data 420 and 430 are extracted from Document B, Document B may be retrieved by combining modified document B 414 with Resource A 455 and Resource B 465 to reform Document B 404. Although not shown, Document A and Document C may also be retrieved in an analogous manner, as discussed above. Moreover, the embodiment shown in FIG. 5 is not intended to be limiting and, in other embodiments, documents may be retrieved by combining any number of resources with a modified document.

The techniques presented herein may provide a number of advantages over conventional techniques for data storage. As an example, the techniques presented herein may reduce storage requirements for data storage, especially with regards to XML transactional message storage, without impairing the ability of a system to store data for archival purposes. Moreover, by utilizing a native datatype construct, like XInclude, techniques presented herein, there is no need for two parties to exchange a protocol during extraction or retrieval. As another example, techniques presented herein may be used to reduce bandwidth usage. Existing capabilities for storage/bandwidth compression don't take advantage of knowledge of the meaning of the data. Techniques presented herein may, either automatically or via user input, exploit knowledge of the meaning of their data model in order to more efficiently store or transmit data while still retaining clear readability. By comparison, encryption would impair the readability of the data.

It will be appreciated that the embodiments described above and illustrated in the drawings represent only a few of the many ways of implementing embodiments for creating data objects to store common data included in documents.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software (e.g., common data module 16) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc). For example, the functions of the present invention embodiments may be distributed in any manner among the various end-user/client and server systems, and/or any other intermediary processing devices. The software and/or algorithms described above and illustrated in the figures may be modified in any manner that accomplishes the functions described herein. In addition, the functions in the figures or description may be performed in any order that accomplishes a desired operation.

The software of the present invention embodiments (e.g., common data module 16) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.), The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardware, wireless link, Intranet, etc.).

The system may employ any number of any conventional or other databases, data stores or storage structures (e.g., files, databases, data structures, data or other repositories, etc.) to store information (e.g., documents, common data, new data objects, and modified documents). The database system may be implemented by any number of any conventional or other databases, data stores or storage structures (e.g., files, databases, data structures, data or other repositories, etc.) to store information (e.g., documents, common data, new data objects, and modified documents). The database system may be included within or coupled to the server and/or client systems. The database systems and/or storage structures may be remote from or local to the computer or other processing systems, and may store any desired data (e.g., documents, common data, new data objects, and modified documents).

The present invention embodiments may employ any number of any type of user interface (e.g., Graphical User Interface (GUI), command-line, prompt, etc.) for obtaining or providing information (e.g., documents, common data, new data objects, and modified documents), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execs to on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
   a processor configured to:
   identify a plurality of sequences of data, wherein each sequence of data appears in at least a threshold percentage of documents of a plurality of documents, and wherein at least two identified sequences of data are identified in different subsets of documents;
   store each sequence of data of the plurality of sequences of data as a resource of a plurality of resources of common data, wherein each resource is stored separately from other resources of the plurality of resources and from the plurality of documents;
   replace each sequence of data within the threshold percentage of documents of the plurality of documents with an identifier, wherein each identifier references the resource of common data corresponding to the replaced sequence of data;
   select a document of the plurality of documents that includes a plurality of the identifiers; and
   retrieve the selected document by replacing each identifier in the document with the corresponding resource of common data referenced by the identifier.

2. The system of claim 1, wherein at least one of the plurality of documents includes an XML document.

3. The system of claim 1, wherein one or more sequences of data are identified by a user.

4. The system of claim 1, wherein a length of the identifier is shorter than a length of the common data.

5. The system of claim 1, wherein the threshold percentage is 15%.

6. The system of claim 1, wherein the identifier is an XInclude directive.

7. The system of claim 1, wherein identified sequences of data are identified in nodes of documents that are specified by a user.

8. A computer program product for storing data, the computer program product comprising one or more computer readable storage media collectively having program instructions embodied therewith, the program instructions executable by a processor to cause the processor to:
   identify a plurality of sequences of data, wherein each sequence of data appears in at least a threshold percentage of documents of a plurality of documents, and wherein at least two identified sequences of data are identified in different subsets of documents;
   store each sequence of data of the plurality of sequences of data as a resource of a plurality of resources of common data, wherein each resource is stored separately from other resources of the plurality of resources and from the plurality of documents;
   replace each sequence of data within the threshold percentage of documents of the plurality of documents with an identifier, wherein each identifier references the resource of common data corresponding to the replaced sequence of data;
   select a document of the plurality of documents that includes a plurality of the identifiers; and
   retrieve the selected document by replacing each identifier in the document with the corresponding resource of common data referenced by the identifier.

9. The computer program product of claim 8, wherein at least one of the plurality of documents includes an XML document.

10. The computer program product of claim 8, wherein one or more sequences of data are identified by a user.

11. The computer program product of claim 8, wherein a length of the identifier is shorter than a length of the common data.

12. The computer program product of claim 8, wherein the threshold percentage is 15%.

13. The computer program product of claim 8, wherein the identifier is an XInclude directive.

14. The computer program product of claim 8, wherein identified sequences of data are identified in nodes of documents that are specified by a user.

* * * * *